Nov. 11, 1952     H. S. NAGIN     2,617,503
GRATING
Filed Sept. 12, 1945
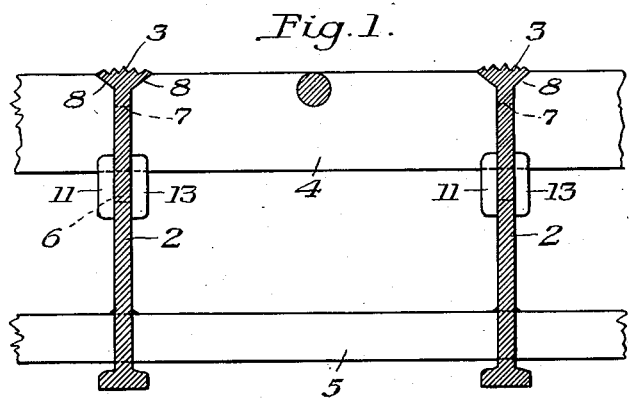
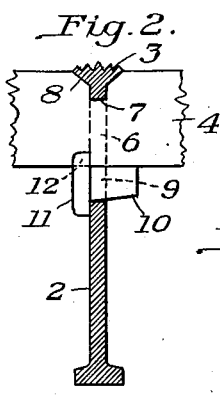
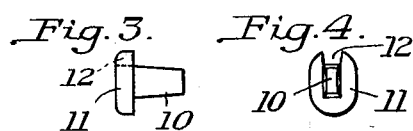
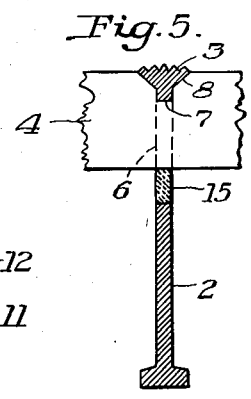
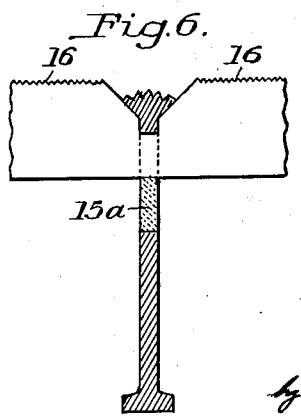
INVENTOR
*Harry S. Nagin*
by his attorneys Patented Nov. 11, 1952

2,617,503

UNITED STATES PATENT OFFICE 2,617,503

GRATING

Harry S. Nagin, Philadelphia, Pa., assignor to Reliance Steel Products Co., McKeesport, Pa., a corporation of Pennsylvania Application September 12, 1945, Serial No. 615,850

4 Claims. (Cl. 189—82)

This invention is for press welded grating and a method of making the same, and relates particularly to a grating having a provision for positively holding the press welded members in position.

Grating members of the type referred to generally have longitudinally extending bearer bars or main load carrying members. Slits are cut in the webs of these members, through which are passed transversely extending grating bars or cross bars. During the press forming of the grating, these cross bars are pushed into the plane of the top of the bearer bars and welding is effected between the contacting edges of the cross bars and the surfaces of the bearer bars with which pressure contact is made. When the grating is finished, there is an open slot under the cross bars. Should the weld be defective, or should the concentration of pressure on the grating in subsequent use be greater than the weld is capable of withstanding, the cross bars might be loosened. To provide a positive way of supporting the cross bars against any looseness or displacement, the present invention has for its object to provide an additional support in the slots in the bearer bars under the cross bars.

The invention may be more fully understood by reference to the accompanying drawings, in which:

Fig. 1 is a transverse section through a portion of a grating embodying one form of my invention;

Fig. 2 is a fragmentary view similar to Fig. 1, showing a single bearer bar in section and a fragment only of one of the cross bars, together with means inserted under the cross bar providing a positive support for the cross bar and filling the bottom of the slot in the bearer member under the cross bar;

Fig. 3 is a side elevation of a rivet or plug in its original form, which rivet is used to fill the opening in the bearer bar under the cross bar;

Fig. 4 is an end elevation of the part shown in Fig. 3;

Fig. 5 is a view similar to Fig. 2 of a somewhat modified embodiment of my invention; and Fig. 6 is a view similar to Figs. 2 and 5, illustrating a modification in detail.

Referring first to Fig. 1, the grating comprises bearer bars or load carrying members 2 which are of relatively heavy section. They may be provided with flared upper edge portions 3. The grating is constructed with cross bars 4 which pass through the webs of the bearer bars 2 and which are welded in place, and there may also be other transverse load distributing bars 5 connecting the bottoms of the bearer bars 2.

In making the assembly shown in Fig. 1, the bearer bars 2 are inverted with respect to the position shown in Fig. 1. The cross members 4 are inserted through previously formed slots 6 in the webs of the members 2. These slots have a width equal to the vertical width of the cross members 4. When the parts are so assembled, pressure and current are applied to the assembly, forcing the cross members 4 toward the top edge portions 3 of the bearer bars. At this time the assembly is, as above indicated, inverted, so that the cross bars in the pressure welding operation are actually pressed downward. The pressure is continued until the surfaces of the members 4 are substantially flush with the surfaces of the bearer bars. As is well understood in the art, heat is generated where the cross members 4 are pressed into contact with the members 3. Normally a weld will develop between the cross bar and the web of the section 2 at the place indicated 7 in Fig. 1, and additional welding may occur at the points designated 8.

During this press forming of the piece, the movement of the members 4 toward the edge surfaces 3 of the cross bars 2 results in an opening developed at 9 between the one end of the slot 6 and the lower edge of the cross bar. When the grating is subsequently finished and turned to an upright position, it will be seen that the cross bars 4 then have no support under their lower edges on the webs of the bearer bars 2, and downward stresses on the cross bars 4 must be transmitted to the bearer bars entirely through the welds.

All of this is known at the present time, and constitutes no part of the present invention. According to the present invention, this part of the slot under the bottom edge of the cross members 4 is provided with an element which will bear against the bottom edges of the cross members 4 and transmit vertical loads downwardly directly into the webs of the cross members 2 so that even though the weld should loosen or break, the grating will still remain intact.

According to the preferred embodiment of the present invention, a rivet having a rectangular shank 10 and a head 11 is inserted in the opening 9, the head 11 of the rivet being cut away or notched as indicated at 12, to enable it to straddle the lower edge of the cross piece 4. The rivet preferably has a slight taper so that any irregularity in the space 9 can be fully taken up. The first step in the operation of the present invention is the insertion of the rivet shown in Fig. 2. After the rivet is inserted, the projecting end of the shank is upset as indicated at 13 in Fig. 1. This prevents the rivet from becoming dislodged. The rivet in turn provides a positive support between the lower edge of the cross member 4 and the bottom of the vertical slot in the web member. It provides an added factor of safety in the assembly so that if the weld between the cross member and bearer bar should fail, the structure will nevertheless remain fully useful. Also, the rivet fills a space which is otherwise difficult to protect by painting, so as to retard corrosion and accumulation of moisture-holding debris in these slots. Since the rivets completely fill the space under the cross members 4, there can be no accumulation of debris which will hold moisture and promote rust at these places.

In lieu of filling the slot in by means of a rivet, the body of metal may be welded into the open part of the slot. This is shown in Fig. 5 where the same reference numerals have been used as in the other figures, but wherein 15 designates a mass of metal which has been filled into the open portion of the slot by welding.

The embodiment of the invention shown in Fig. 2 is preferable to that shown in Fig. 5 because the operation can be more cheaply and quickly performed and the hole is more effectively welded without risking damage of the structure by heating.

In the modification shown in Fig. 6 the assembly is such that the top edge portions of the bearer bars are located beneath the top edges of the cross bars, and the upper edges of the cross bars may be knurled as indicated at 16. The vertical extent of the slots formed in the bearer bars to permit of this modification is greater than in the structures described above, as is manifest in the drawings, and the insert in the slot below the lower edges of the cross bars is of correspondingly greater vertical dimension. The insert may consist either of a rivet, or of a body of metal welded into the open part of the slot as indicated at 15a.

It will be understood that while I have shown two specific ways of filling the slots, various changes and modifications may be made within the contemplation of my invention and under the scope of the appended claims. It has heretofore been proposed in some cases in forming the slots, to cut away the part of the metal of the web in such manner that it can be bent back into the slot after the assembly has been made, but this is in many cases not feasible, in other cases is difficult to accomplish, and is substantially more expensive and less effective than the present invention, and the metal being so bent, frequently breaks and also is in the way during the press welding operation, whereas with the present invention, the slot is filled entirely after the grating has been otherwise finished.

I claim:

1. In a press welded grating having parallel bearer bars and cross bars connecting the bearer bars, the cross bars being received in vertical slots in the bearer bars, with the lower edges of the cross bars above the bottom edges of the slots, the invention comprising a rivet having a shank with spaced axially extending surfaces at least one of which is inclined, said shank being positioned between said edges with said inclined surface engaged with one of said edges and the other of said surfaces engaged with the other of said edges, said inclined surface operating as a cam to force said cross bars upwardly upon axial movement of the shank into position between said edges.

2. In a press welded grating having parallel bearer bars and cross bars connecting the bearer bars, the cross bars being received in vertical slots in the bearer bars, with the lower edges of the cross bars above the bottom edges of the slots, the invention comprising a rivet having a preformed head at one end and a shank projecting therefrom positioned between said edges, said head providing an abutment engaged with a lateral surface on one of said bearer bars for preventing movement of said shank in one endwise direction with respect to the bearer bar engaged thereby, and an upset head at the other end of said shank engaged with an opposite surface of said one bearer bar for preventing movement of said shank in an opposite endwise direction, said shank having vertically spaced surfaces respectively in tight engagement with said slot and cross bar edges for holding said cross bar against downward movement in said slot.

3. In a press welded grating having parallel bearer bars and cross bars connecting the bearer bars, the cross bars being received in vertical slots in the bearer bars, with the lower edges of the cross bars above the bottom edges of the slots, the invention comprising a rivet having a preformed head at one end and a shank projecting therefrom positioned between said edges, said head providing an abutment engaged with a surface on one of said bearer bars for preventing movement of said shank in one endwise direction with respect to the bearer bar engaged thereby, said shank having spaced axially extending surfaces at least one of which is inclined, said shank being positioned between said edges with said inclined surface engaged with one of said edges and the other of said surfaces engaged with the other of said edges, and an upset head at the other end of said shank engaged with an opposite surface of said one bearer bar for preventing movement of said shank in an opposite endwise direction.

4. In a press welded grating having parallel bearer bars and cross bars connecting the bearer bars, the cross bars being received in vertical slots in the bearer bars, with the lower edges of the cross bars above the bottom edges of the slots, the invention comprising a rivet having a preformed head at one end and a rectangular shank projecting therefrom positioned between said edges, said head having a notch therein to provide an upper surface engaged with the lower edge of one of said cross bars along the entire length of the rivet with the head portion defining said notch straddling said one cross bar, said head providing an abutment engaged with a lateral surface on one of said bearer bars for preventing movement of said shank in one endwise direction with respect to the bearer bar engaged thereby, and an upset head at the other end of said shank engaged with an opposite surface of said one bearer bar for preventing movement of said shank in an opposite endwise direction, said shank having a second surface spaced vertically below said upper surface and engaged with the bottom edge of one of said slots.

HARRY S. NAGIN.

REFERENCES CITED

The following references are of record in the file of this patent:

UNITED STATES PATENTS

| Number | Name | Date |
| --- | --- | --- |
| 1,309,698 | Scherbner | July 15, 1919 |
| 2,319,468 | Nagin et al. | May 18, 1943 |